June 19, 1962 J. F. HEALY 3,040,180

MEANS FOR MOUNTING A LIGHT-SENSITIVE CELL

Filed July 27, 1959

INVENTOR
BY Joseph F. Healy
Wooster, Davis & Cifelli
ATTORNEYS

United States Patent Office 3,040,180

Patented June 19, 1962

3,040,180
MEANS FOR MOUNTING A LIGHT-SENSITIVE CELL

Joseph F. Healy, Westport, Conn., assignor to Harvey Hubbell, Incorporated, Bridgeport, Conn., a corporation of Connecticut Filed July 27, 1959, Ser. No. 829,909
14 Claims. (Cl. 250—239)

This invention relates to means for mounting a light-sensitive cell so as to effect proper physical support therefor, and to facilitate electrical connection thereof.

It is an object of the invention to provide a simple, inexpensive, yet thoroughly effective, means for mounting a light-sensitive cell so as to provide for its proper physical support and to facilitate electrical connection thereof in an electrical circuit of which it forms a part.

The object of the invention is achieved in one form by providing a suitable frame for supporting the light-sensitive cell, and a pair of mounting and contact members which individually perform multiple functions, including those of assisting in the physical mounting of the light-sensitive cell in the frame and providing for the electrical connection of the cell in an electrical circuit.

The above and other objects and further details of that which I believe to be novel and my invention will be clear from the following description and claims taken with the accompanying drawings, wherein:

Figures 6, 9:
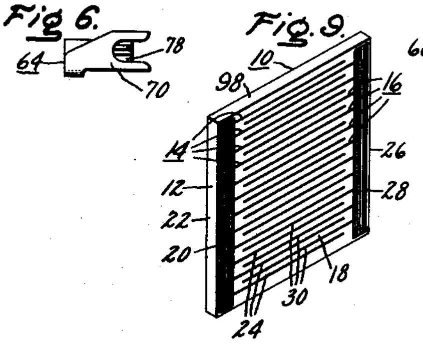
FIG. 6 is a bottom plan view thereof.
FIG. 9 is a perspective view of the light-sensitive cell.
Figure 10:
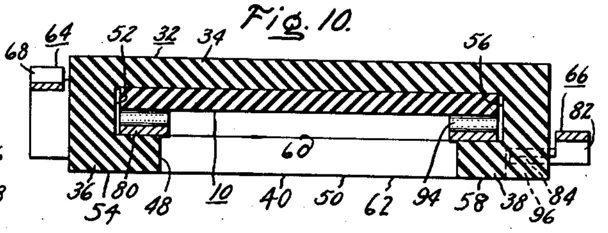
FIG. 10 is a sectional view taken substantially on line 10—10 of FIG. 1.

In the drawing, one physical embodiment of the invention is illustrated. A light-sensitive cell, which is sometimes referred to as a photo-electric cell or photo-conductive cell, is designated by reference numeral 10, and can best be seen by itself in FIG. 9. The invention pertains to an improved means for mounting light-sensitive cells, such as the illustrated cell, 10 so as to both properly physically support it and provide for its electrical connection in an electrical circuit.

Cell 10 comprises a planar, plate-like body 12 which is made of a light-sensitive material, such as zirconium oxide or selenium, having spaced electrical conducting means in the form of two sets 14 and 16 of electrical conducting bars formed on the planar front side 18 of the body 12. These materials are exemplary of light-sensitive materials which function as electrical insulators when free of light and which are transformed into electrical conductors when light impinges on them. As can best be seen in FIG. 9, each set of bars comprises a wide, vertically extending bar that is disposed at one vertical lateral edge of the body 12, and a plurality of spaced, narrow, horizontally extending bars that extend toward, but short of, the opposite vertical lateral edge thereof. The set 14 comprises a vertical bar 20 which is disposed at the vertical lateral edge 22 of the body 12, and a plurality of spaced horizontal bars 24 which are in contact at one of their ends with the bar 20 and extend toward, but short of, the opposite vertical lateral edge 26 of the body. The set 16 comprises a vertical bar 28 which is disposed at vertical lateral edge 26 of the body 12, and a plurality of horizontal bars 30 which are in contact at one of their ends with the bar 28 and extend toward, but short of, the edge 22 of the body.

The sets 14 and 16 of bars may be formed on the front side 18 of the body 12 by any convenient method, such as by being deposited thereon by printing, stamping or the like. The particular material of which these bars are made is a good electrical conductor, such as copper, that is readily adaptable to being formed on the cell body. The sets 14 and 16 of bars are spaced, i.e., not normally in electrical connection, because they are spaced from each other at all points by the material of which body 12 is made. However, the horizontal bars alternate in the direction in which they extend so as to form a network of intermeshing conducting bars which are arranged to be electrically connected by an infinite number of parallel paths on the occurrence of the material of which the cell body 12 is made changing from an electrical insulator to an electrical conductor, which occurs when light impinges on the cell body. This phenomenon is generally known, and the materials enumerated above, namely, zirconium oxide and selenium, have the known property of changing from an electrical insulator to an electrical conductor when light impinges on them.

The cell 10 is physically properly supported by the frame 32 so as to be operatively incorporated in an assembly with which it functionally cooperates. Frame 32 comprises a walled holder which is unitary and made of an electrical insulating material, such as a suitable plastic material, such as Bakelite or the like. Frame 32 comprises a planar back wall 34, channel-shaped side wall portions 36 and 38 respectively, and channel-shaped bottom wall portion 40. Centrally of the bottom wall portion 40 there depends an integrally formed, stub shaft 42, which is arranged to rigidly mount the entire frame 32 on a support 44 of any suitable type by being received in a socket 46 formed therein.

The back wall 34 is substantially continuous and is integrally formed with the side wall portions 36 and 38 and the bottom wall portion 40, which cooperate to form a top opening 47 through which the cell 10 may pass when being mounted in or removed from the frame 32, and a substantial opening 48 at the front 50 of the frame through which the front side 18 of the cell may face the atmosphere.

The frame 32 is designed so as to loosely house the cell 10. A vertical groove 52 is formed in the side wall portion 36 and thereby provides a side channel having a vertical front flange 54 which is spaced from the back wall 34, and an aligned vertical groove 56 is formed in the side wall portion 38 to thereby form a side channel having a vertical front flange 58 which is spaced from the back wall. A horizontal groove 60 is formed in the bottom wall portion 40 and thereby forms a bottom channel having a horizontal front flange 62. The channels formed by grooves 52, 56 and 60 cooperate to form a U-shaped guideway open at the top for slidably receiving and retaining the vertical side edges and the bottom edge of cell 10, and the front flanges 54, 58 and 62 cooperate to define the previously mentioned U-shaped opening 48, in the front of the frame 32. Therefore, with the structure described thus far, the cell 10 may be loosely mounted in the frame 32 by being inserted therein through the opening 47 and slid therein in such a manner that its front side 18 is disposed so as to face the opening 48 in the frame.

It is necessary both to properly physically support the cell 10 in the frame 32 and to electrically connect the cell into an electrical circuit. In order to accomplish both of these necessary functions, novel mounting and contact members are utilized. Mounting and contact member 64 is illustrated at the left hand side of FIG. 1 and is shown by itself in FIGS. 4–6; mounting and contact member 66 is illustrated at the right hand side of FIG. 1 and is shown by itself in FIGS. 7 and 8. The members 64 and 66 which will be designated herein as "contact springs," are both made of a thin, resilient leaf of electrical conducting material, such as beryllium copper.

Contact spring 64 comprises an elongated, flat, vertical leg 68 having a transversely bent, forked, mounting flange 70 at its lower end, which is adapted to be locked under the head of a terminal binding screw 72 of an electrical terminal for connecting the electrical lead 74, which is part of the wiring of an electrical circuit which the cell 10 controls, thereto. Contact spring 64 also includes a short, upper, horizontal, connecting leg 76 having a transversely offset tab 78 and a downwardly extending, vertical leg 80 which is transversely alternately bent in opposite directions in a generally sinuous manner (see FIG. 5).

Contact spring 66 comprises an elongated, flat, vertical leg 82 having a lower laterally extending tab 84, which functions as a latch as will become apparent, a short, upper, horizontal, connecting leg 86 having a vertical extension 88 at one lateral side thereof which is bent at its upper end and arranged to encircle and firmly grip an electrical lead 90 which also forms a part of the wiring of an electrical circuit which the cell 10 controls, a transversely extending tab 92 at the other lateral side thereof, and a downwardly extending, vertical leg 94 which is bent in a generally similar manner to that of leg 80 of contact spring 64.

The contact springs 64 and 66 are assembled to the associated frame 32 and cell 10, after the cell has been loosely mounted in the frame in a manner to have the front side 18 thereof face through the frame opening 48, by having their sinuously bent legs 80 and 94, respectively, forced between the flanges 54 and 58, respectively, and the vertical lateral edges 22 and 26 of the front side 18 of the cell body 12. When so disposed, the legs 80 and 94 are compressed transversely and stressed, and therefore, they bias the cell body 12 backwardly against the back wall 34 of the frame 32. It should be particularly noted that when so mounted, the legs 80 and 94 are in firm physical contact with the vertical electrical conducting bars 20 and 28, respectively; therefore, they not only function to assist in properly physically mounting the cell 10 in the frame 32, but they also function to electrically connect the vertical electrical conducting bars 20 and 28, which form a part of the electrical conducting means of the cell, to electrical leads 74 and 90.

As was previously pointed out, the mounting flange 70 of the contact spring 64 is arranged to be locked under a terminal binding screw 72 and to be in firm physical contact with the electrical lead 74 which, as will be understood by those skilled in the art, forms a part of the wiring of an electrical circuit into which the cell 10 is integrated and which it controls.

Figures 1, 2, 3, 4, 5, 7, 8:
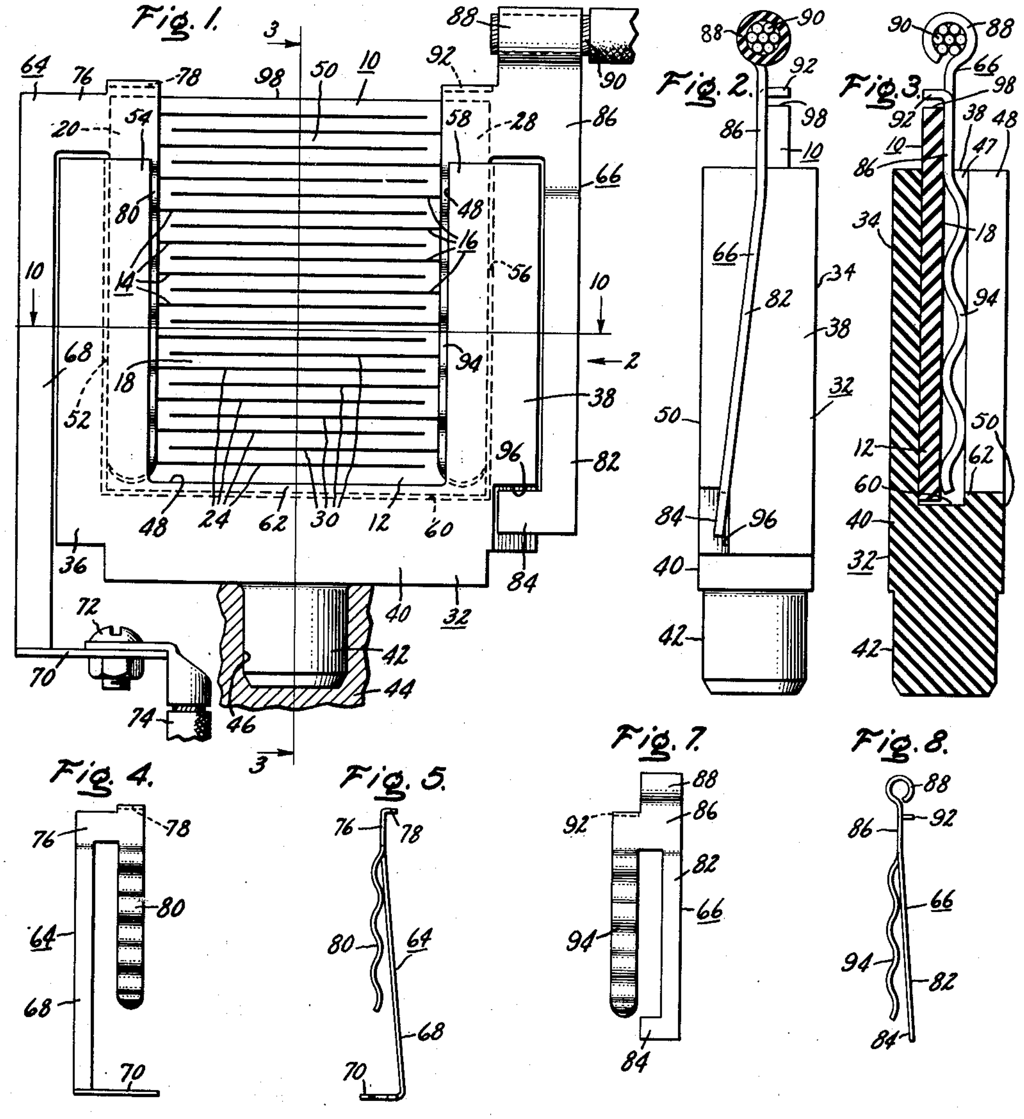
FIG. 1 is a front elevational view of a light-sensitive cell and the mounting means therefor.
FIG. 2 is a side elevational view thereof looking in the direction of the arrow in FIG. 1.
FIG. 3 is a sectional view taken substantially on line 3—3 of FIG. 1.
FIG. 4 is a front elevational view of the left hand mounting and contact member as viewed in FIG. 1.
FIG. 5 is a side elevational view thereof.
FIG. 7 is a front elevational view of the right hand mounting and contact member, as viewed in FIG. 1.
FIG. 8 is a side elevational view thereof.

Also, as was pointed out above, the contact spring 66 is arranged to be electrically connected to the electrical lead 90, which also forms a part of the wiring of an electrical circuit into which the cell 10 may be integrated. The contact spring 66 includes additional means for securely mounting it on the frame 32 and for preventing it from being inadvertently removed therefrom, in the form of the latching tab 84 that is adapted to be disposed in a notch 96 formed in the lower right hand corner of the frame, as viewed in FIG. 1. In order to mount the latching tab 84 in the notch 96, it is necessary to deform the leg 82 of the contact spring 66, and to thereby stress it, as can best be seen in FIG. 2, and by comparing the FIG. 2 showing with the FIG. 8 showing of the contact spring 66 in its free state.

When fully assembled, the cell 10, frame 32 and contact springs 64 and 66 are generaly disposed and related as indicated in FIGS. 1–3, and 10. In the case of both contact springs, transverse tabs 78 and 92 individually function to limit the extent of downward movement of the contact springs by contacting the top edge 98 of the cell body 12, and preventing further downward movement.

In view of the foregoing, it will be apparent that a simple, effective, inexpensive means has been provided for operatively mounting a light-sensitive cell. It will be appreciated by those skilled in the art that the cell is physically supported in the frame 32 in a secure manner; it should be noted in this connection: that one of the contact springs (64) is mounted on the frame 32 and rigidly secured by its forked mounting flange 70 to a terminal binding screw which effects electrical connection of one set of electrical conducting bars (14) into the electrical circuit which the cell controls; the frame 32 is centrally vertically supported from below by the stub shaft 42 and support 44; and the other contact spring (66) is mounted on the frame 32 and latched thereon by the latching tab 84, therefore requiring the latching tab to be intentionally pulled out of the latching notch 96 before the contact spring 66 may be removed from the frame, and electrically connects the other set of electrical conducting bars 16 into the electrical circuit. It will be apparent to those skilled in the art that an effective electrical connection between the light-sensitive cell 10 and the electrical leads 74 and 90 of the wiring of the electrical circuit into which the light-sensitive cell 10 is integrated is effectuated.

A light-sensitive cell of the type contemplated to be mounted in my invention may be utilized for many practical applications so as to control an electrical component. For example, it may be incorporated into the circuitry of an electrical street illumination control system, wherein it is desired to de-energize the electrical street illuminating means during the daytime, and this may be accomplished by utilizing a light-sensitive cell, such as the cell 10, and appropriately mounting it so as to respond to daylight or another source of light, so as to transform itself from a circuit-breaking means to a circuit-making means. The electrical circuit into which the light-sensitive cell 10 is integrated may include a heater for a bimetallic contact-carrying member which forms part of an electrical switch in another electrical circuit which includes the electrical illuminating means. The electrical components of the control system may be designed and mounted in a known manner so as to operate when light impinges on the cell 10 to cause heating of the heater and the consequential deflection of the bimetallic member to open the electrical switch in the circuit for the illuminating means. It should be clearly understood that various and other practical applications of the light-sensitive cell may be made and that the foregoing examples are merely exemplary.

As will be evident from the foregoing description, certain aspects of my invention are not limited to the particular details of construction of the example illustrated, and I contemplate that various other modifications and applications will occur to those skilled in the art. It is, therefore, my intention that the appended claims shall cover such modifications and applications as do not depart from the true spirit and scope of my invention.

What I claim as new and desire to secure by Letters Patent of the United States is:

1. The combination of: a light sensitive cell comprising a planar member; a unitary frame made of electrical insulating material for operatively supporting said cell; said frame having a U-shaped guideway that is channel-shaped in cross section for slidably receiving said cell; and a pair of spaced metallic mounting and contact members supported by said frame; each of said members being integral and having a mounting portion and an electrical terminal portion, said mounting portion being in electrical contact with said cell for facilitating electrical connection of said cell into an electrical circuit and disposed in said guideway in physical contact with said cell and said frame for assisting in mounting said cell on said frame, and said electrical terminal portion disposed on the exterior of said frame for being electrically connected to an electrical lead whereby the cell may be connected in an electrical circuit.

2. The combination defined in claim 1 wherein said frame includes means for rigidly mounting said frame on a support.

3. The combination defined in claim 1 wherein said mounting portions are resilient.

4. The combination defined in claim 3 wherein said mounting portions are bent into a generally sinuous configuration in cross section.

5. The combination of: a light sensitive cell; said cell comprising a planar member made of material which is electrically conductive only when subjected to light, and spaced electrical conducting means disposed on one planar side of said member which are arranged to be electrically connectel only when said material is subjected to light; said means including a pair of spaced electrical conducting formations disposed at opposite edges of said member; a frame made of electrical insulating material for supporting said cell having an open front toward which said one planar side of said member faces, and walls including spaced wall portions at each of two opposite ends of said frame arranged to support two opposite edges of said cell; and a pair of metallic mounting and contact members for assisting in mounting said cell and electrically connecting said cell in an electrical circuit mounted on said frame; one of said mounting and contact members being disposed at each of said two opposite ends of said frame, each of said mounting and contact members having a mounting portion in contact with an edge of said cell, the electrical conducting formation disposed thereat and a part of said wall portions and biasing its associated cell edge against another part of said wall portions, and each of said mounting and contact members having an electrical terminal portion disposed on the exterior of said frame.

6. The combination defined in claim 5 wherein said mounting portions are bent in a generally sinuous manner and stressed.

7. The combination defined in claim 5 wherein said frame includes means for rigidly mounting said frame on a support.

8. The combination defined in claim 5 wherein said frame has a notch formed in the exterior thereof; and one of said members has a latch that is arranged to be disposed in said notch; said one member being resilient and configlred so that it is stressed when it is mounted on said frame and said latch is disposed in said notch whereby said one member is securely mounted on said frame.

9. The combination defined in claim 5 wherein said mounting portions are resilient.

10. The combination defined in claim 5 wherein said electrical terminal portion of one of said members includes a forked mounting flange which is arranged to be lockel under the head of a terminal binding screw.

11. The combination of: a light-sensitive cell; a frame for operatively supporting said cell; and a pair of spaced mounting and contact members mounted on said frame; each of said members having a mounting portion in electrical contact with said cell for facilitating electrical connection of said cell into an electrical circuit and in physial contact with said cell and said frame for assisting in mounting sail cell on said frame, and an electrical terminal portion disposed on the exterior of said frame for being electrically connected to an electrical lead whereby the cell may be connected into an electrical circuit; said frame having a notch formed in the exterior thereof; and one of said members having a latch that is arranged to be disposed in said notch; said one member being resilient and configured so that it is stressed when it is mountel on said frame and said latch is disposed in said notch whereby said one member is securely mounted on said frame.

12. The combination of: a light-sensitive cell; a frame for operatively supporting said cell; and a pair of spaced mounting and contact members mounted on said frame; each of said members having a mounting portion in electrical contact with sail cell for facilitating electrical connection of said cell into an electrical circuit and in physical contact with said cell and said frame for assisting in mounting said cell on said frame, and an electrical terminal portion disposed on the exterior of said frame for being electrically connected to an electrical lead whereby the cell may be connected in an electrical circuit; and the electrical terminal portion of one of said members including a forked mounted flange which is arranged to be locked under the head of the terminal binding screw.

13. The combination of: a light-sensitive cell; a frame for operatively supporting said cell including means for rigidly mounting said frame on a support; and a pair of spaced mounting and contact members made of thin resilient electrical conducting metal mounted on said frame; each of said members having a mounting portion that is bent in a generally sinuous manner in electrical contact with said cell for facilitating electrical connection of said cell into an electrical circuit and in physical contact with said cell and said frame for assisting in mounting said cell on said frame by biasing it against said frame, and an electrical terminal portion disposed on the exterior of said frame for being electrically connected to an electrical lead whereby the cell may be connected into an electrical circuit; said frame having a notch formed in the exterior thereof; and one of said members having a latch that is arranged to be disposed in said notch; said one member being resilient and configured so that it is stressed when it is mounted on said frame and said latch is disposed in said notch whereby said one member is securely mounted on said frame.

14. The combination defined in claim 13 wherein the electrical terminal portion of the other of said members includes a forked mounting flange which is arranged to be locked under the head of a terminal binding screw.

References Cited in the file of this patent

UNITED STATES PATENTS

| | | |
|---|---|---|
| 1,122,594 | Harrison | Dec. 29, 1914 |
| 2,277,013 | Carlson | Mar. 17, 1942 |
| 2,402,662 | Ohl | June 25, 1946 |
| 2,406,139 | Fink et al. | Aug. 20, 1946 |
| 2,706,763 | Glynn | Apr. 19, 1955 |
| 2,713,642 | Powers et al. | July 19, 1955 |
| 2,770,704 | Razlag | Nov. 13, 1956 |
| 2,795,682 | Knoll | June 11, 1957 |